(12) United States Patent
Parvey

(10) Patent No.: US 9,352,795 B2
(45) Date of Patent: May 31, 2016

(54) MOTORCYCLE FOOTREST MOUNT

(71) Applicant: Kuryakyn Holdings, LLC, Somerset, WI (US)

(72) Inventor: Daniel E Parvey, New Richmond, WI (US)

(73) Assignee: KURYAKYN HOLDINGS, LLC, Somerset, WI (US)

(*) Notice: Subject to any disclaimer, the term of this patent is extended or adjusted under 35 U.S.C. 154(b) by 0 days.

(21) Appl. No.: 14/169,473

(22) Filed: Jan. 31, 2014

(65) Prior Publication Data

US 2015/0217826 A1 Aug. 6, 2015

(51) Int. Cl.
*B62J 25/00* (2006.01)

(52) U.S. Cl.
CPC ..................................... *B62J 25/00* (2013.01)

(58) Field of Classification Search
CPC ................................ B62J 25/00; B62K 23/02
See application file for complete search history.

(56) References Cited

U.S. PATENT DOCUMENTS

| | | | | |
|---|---|---|---|---|
| 1,261,442 | A * | 4/1918 | Rigby | B62J 25/00 280/291 |
| 4,456,090 | A * | 6/1984 | Malenotti | B62J 25/00 180/219 |
| 5,779,254 | A | 7/1998 | James et al. | |
| 6,173,983 | B1 * | 1/2001 | Moore | B62J 25/00 280/291 |
| D454,828 | S | 3/2002 | Alder | |
| 6,663,129 | B1 * | 12/2003 | Smith | B62J 25/00 280/288.4 |
| 6,719,316 | B1 * | 4/2004 | Anthony | B62J 25/00 280/291 |
| D547,243 | S | 7/2007 | Matsumura et al. | |
| 7,264,255 | B1 * | 9/2007 | Winfrey | B62J 25/00 180/219 |
| D562,112 | S | 2/2008 | Harrell | |
| D564,419 | S | 3/2008 | Clontz | |
| D579,383 | S | 10/2008 | Owyang | |
| 7,637,523 | B2 * | 12/2009 | Fouhy | B62J 25/00 280/291 |
| D613,591 | S | 4/2010 | Lee | |
| D653,175 | S | 1/2012 | Parvey | |
| 8,181,982 | B1 * | 5/2012 | Ward | B62J 25/00 280/163 |
| D662,861 | S | 7/2012 | Foos | |
| 8,388,008 | B2 | 3/2013 | Smith | |
| D718,671 | S * | 12/2014 | Parvey | D12/114 |
| 2001/0027695 | A1 * | 10/2001 | Lumpkin | B60T 11/046 74/502.4 |
| 2001/0037917 | A1 * | 11/2001 | Lumpkin | B60T 11/046 188/24.12 |
| 2002/0158441 | A1 * | 10/2002 | Essinger | F02B 61/02 280/291 |
| 2003/0071438 | A1 * | 4/2003 | Burkett | B62J 25/00 280/291 |
| 2004/0140646 | A1 * | 7/2004 | Gorman | B62J 25/00 280/291 |
| 2005/0012300 | A1 * | 1/2005 | Egan | B62J 25/00 280/291 |
| 2007/0062327 | A1 * | 3/2007 | Kouchi | B62J 25/00 74/564 |
| 2007/0063479 | A1 * | 3/2007 | Fouhy | B62J 25/00 280/288.4 |

(Continued)

OTHER PUBLICATIONS

Kuryakyn, Accessories for Goldwing, pp. 1, 51-53, and 75, published Feb. 22, 2013.

*Primary Examiner* — Kevin Hurley
*Assistant Examiner* — Gabriela C Craciun
(74) *Attorney, Agent, or Firm* — Barnes & Thornburg LLP

(57) ABSTRACT

A motorcycle footrest mount includes a support arm that is length adjustable and pivotally adjustable. The mount attaches to a motorcycle structure and includes a helical ramp. One end of the support arm is pivotably mounted to the helical ramp and is spring biased against the mount in a first, home position. The other end of the support arm is mounted to a footrest. The support arm is able to pivotally move downward along the helical ramp upon application of force by a motorcycle operator's legs and feet on the footrest, and to return to the home position when the operator removes his or her feet from the footrest by virtue of the spring biasing.

5 Claims, 5 Drawing Sheets

(56) References Cited

U.S. PATENT DOCUMENTS

| | | | |
|---|---|---|---|
| 2007/0085299 A1* | 4/2007 | Hanlon | B62J 11/00 280/288.4 |
| 2008/0179859 A1* | 7/2008 | Boehmke | B62J 25/00 280/291 |
| 2012/0205888 A1* | 8/2012 | Parvey | B62J 25/00 280/163 |
| 2012/0223505 A1* | 9/2012 | Ikeda | B60T 7/06 280/291 |
| 2014/0069733 A1* | 3/2014 | Kahlert | B62H 1/12 180/218 |

* cited by examiner

MOTORCYCLE FOOTREST MOUNT

BACKGROUND

Motorcycle operators often seek to rest their feet on a footpeg or a floorboard mounted to the motorcycle when they are riding the motorcycle. For comfort, at times it is desirable for the operator to support his/her feet with the operator's legs extended. There continues to be a need for a footrest mount that is able to be adjusted for optimal operator comfort during operation of the motorcycle.

SUMMARY

Brief Description of the Drawings

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration exemplary embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments or variations may be utilized and structural or logical changes may be made without departing from the scope of the present invention. The following detailed description, therefore, is not to be taken or construed in a limiting sense, and the scope of the present invention is defined solely by the appended claims. The terms used in the claims are intended to have their plain, ordinary meaning and no disclosure or written description herein shall be construed to specially or uniquely define the claim terms unless it is explicitly stated herein that such term is being given a specific definition.

Figure 1:
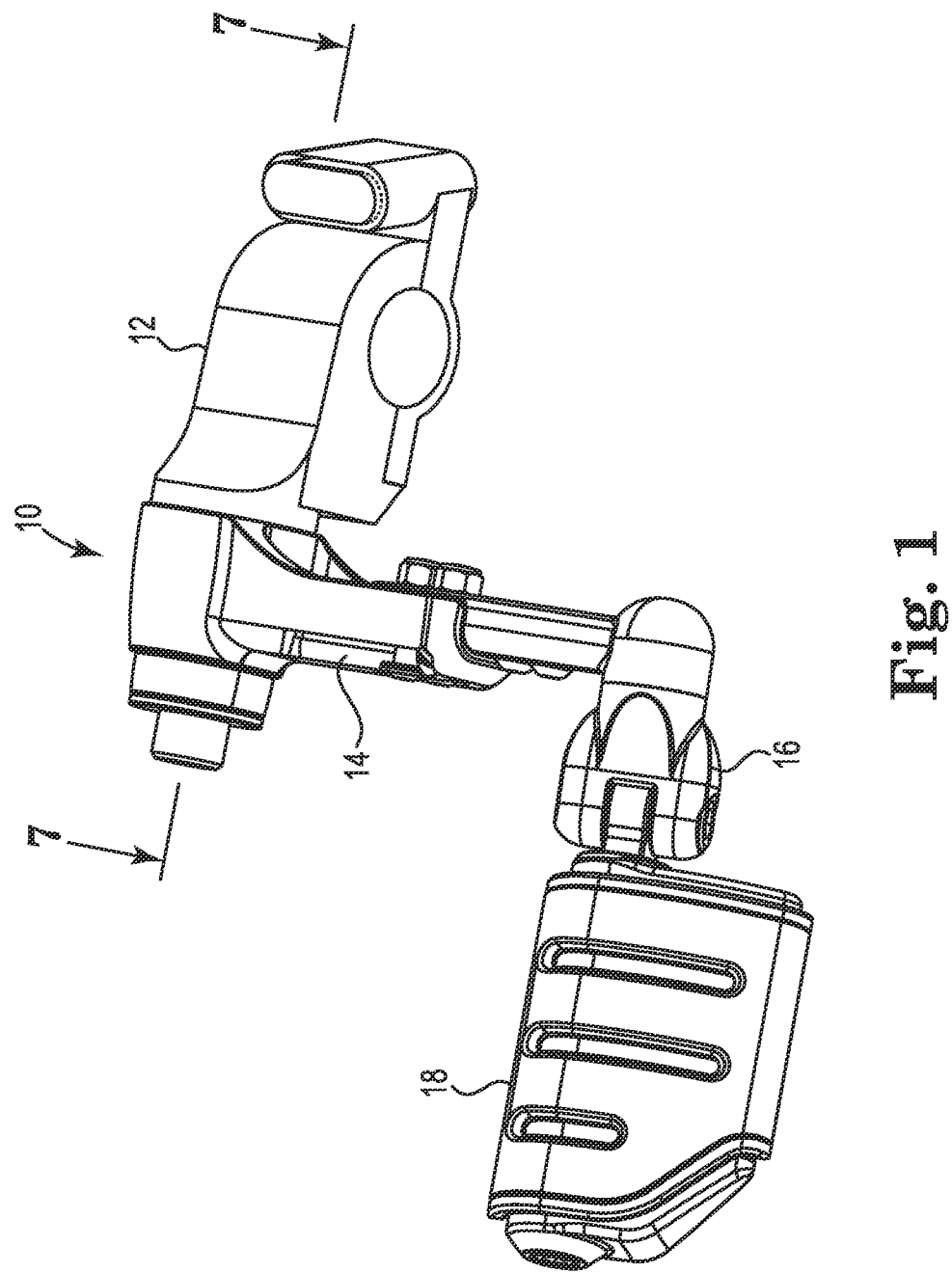
FIG. 1 is a top perspective view of one embodiment of an adjustable motorcycle footrest mount of the present invention.

FIG. 1 is a top perspective view of one embodiment of an adjustable motorcycle footrest mount 10 that is mountable to a suitable structure on both sides of a motorcycle, e.g., a motorcycle frame member or a motorcycle roll bar. In one embodiment, each footrest mount 10 includes a clamp-style mount 12, a support arm 14 connected at one end to mount 12, and secured at the opposite end to a clevis-type connector 16, and a footrest 18 pivotally connected to connector 16. As shown in FIG. 1, motorcycle footrest mount 10 supports an operator's foot at a height defined by support arm 14. As will be shown, mount 10 is configured to permit easy adjustment of the height of footrest 18 by allowing support arm 14 to pivot downward when an operator's foot applies force to the footrest, such as when the motorcycle is being driven on a highway. To provide greater clearance between the footrest mount 110 and the ground, such as when it is necessary for an operator to perform turn maneuvers by leaning the motorcycle, the support arm automatically returns to the original position when the feet of the operator are removed from the footrest 18.

Figure 2:
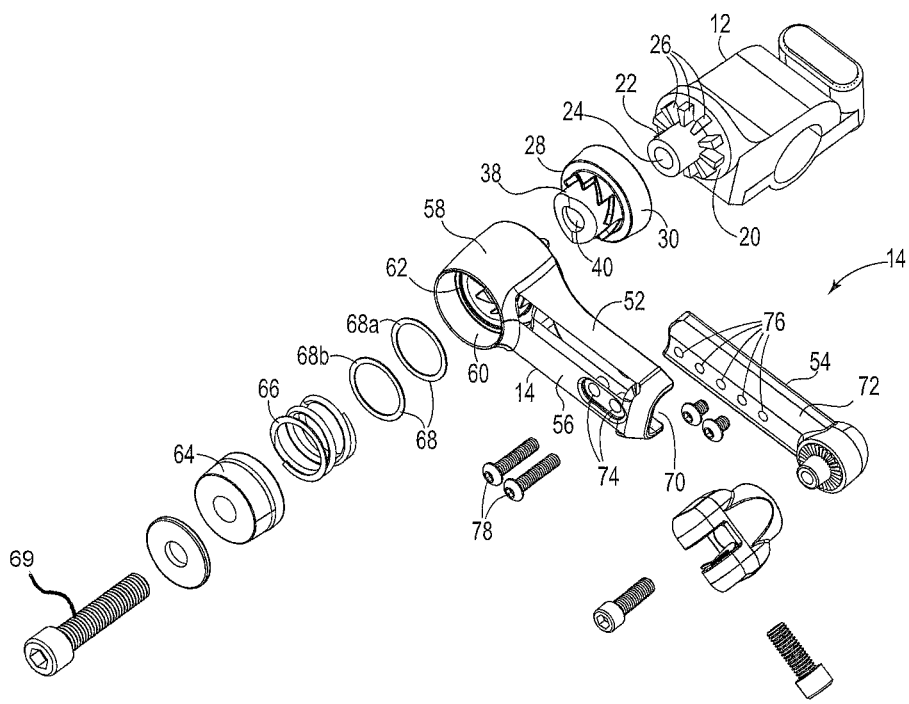
FIG. 2 is an exploded view of the adjustable motorcycle footrest mount of FIG. 1.

FIG. 2 is an exploded view of the adjustable motorcycle footrest mount 10 of FIG. 1 without footrest 18. As shown in FIG. 2, in one embodiment, mount 12 comprises a two-piece, clam-style clamp for securing mount 12 to a suitable structure near a front end of a motorcycle, such as a roll bar or motorcycle frame member. In one embodiment, mount 12 may include a radial face 20 and a central post 22 axially extending from the radial face and having an internally threaded bore 24. In one embodiment, a plurality of teeth 26 are radially spaced around bore 24 against the radial face 20.

Figure 4:
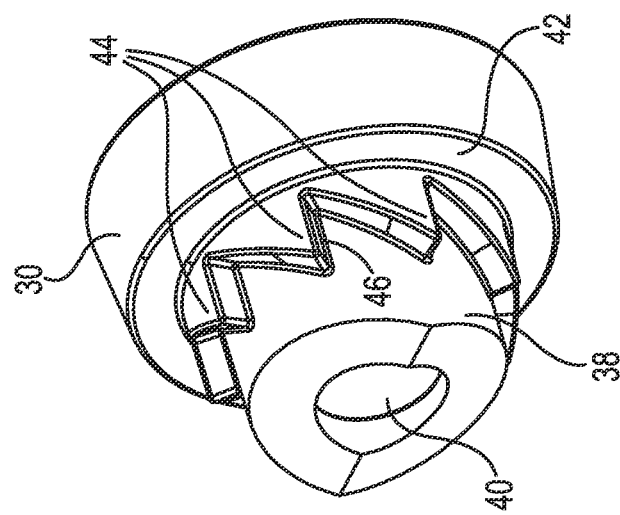
FIG. 4 is a front perspective view of the hub of FIG. 3
Figure 3:
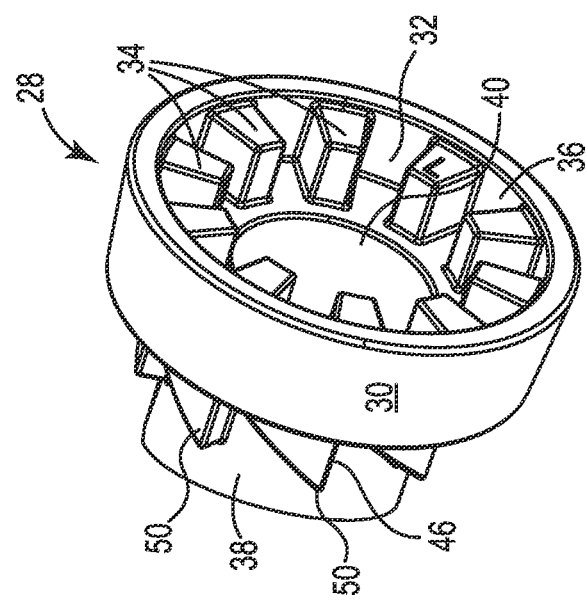
FIG. 3 is a rear perspective view of one embodiment of a hub of the adjustable motorcycle footrest mount of FIG. 1.

As shown in FIGS. 2 and 3, a hub 28 includes a cylindrical body 30 and a recessed cavity 32 on one end that faces mount 12. The recessed cavity 32 is provided with a plurality of radially spaced teeth 34 on an inner cylindrical surface 36 of body 30. The spacing of teeth 34 is sized to approximate the width of teeth 26 on mount 12 such that the spaces are able to mate with teeth 26 to prevent rotational movement of hub 28. The hub 28 further includes a post 38 extending from the cylindrical body 30 and a bore 40 coaxially located within the post 38. The end 39 is radially tapered on either side of a line defined by the diameter of the post. Bore 40 communicates with the recessed cavity 32. As shown in FIGS. 2-4, arranged around a base of the post 38 and against a radial face 42 of the cylindrical body 30 is a plurality of radially-spaced, ramped teeth 44. Each ramped tooth 44 has a first edge 46 that extends axially from the face 42 of the cylindrical body 30, and a second edge 48 that extends at an angle, from the first edge 46 at an apex 50 of the tooth 44, to the adjacent tooth 44 at the lowest end of its first edge 46. The second edge 48 extends in a slightly convex curve from the apex 50 to the adjacent tooth 44. Collectively, the ramped teeth 44 function as a helical ramp as will be described further below. In one embodiment, hub 28 is provided with eight radially spaced teeth 44. In an alternative embodiment, hub 28 may be provided with two or more radially-spaced ramped surfaces, or one contiguous helical ramp. Although hub 28 is shown as a separate component, in an alternative embodiment, hub 28 can be integral with or connected to mount 12.

Figures 5, 6:
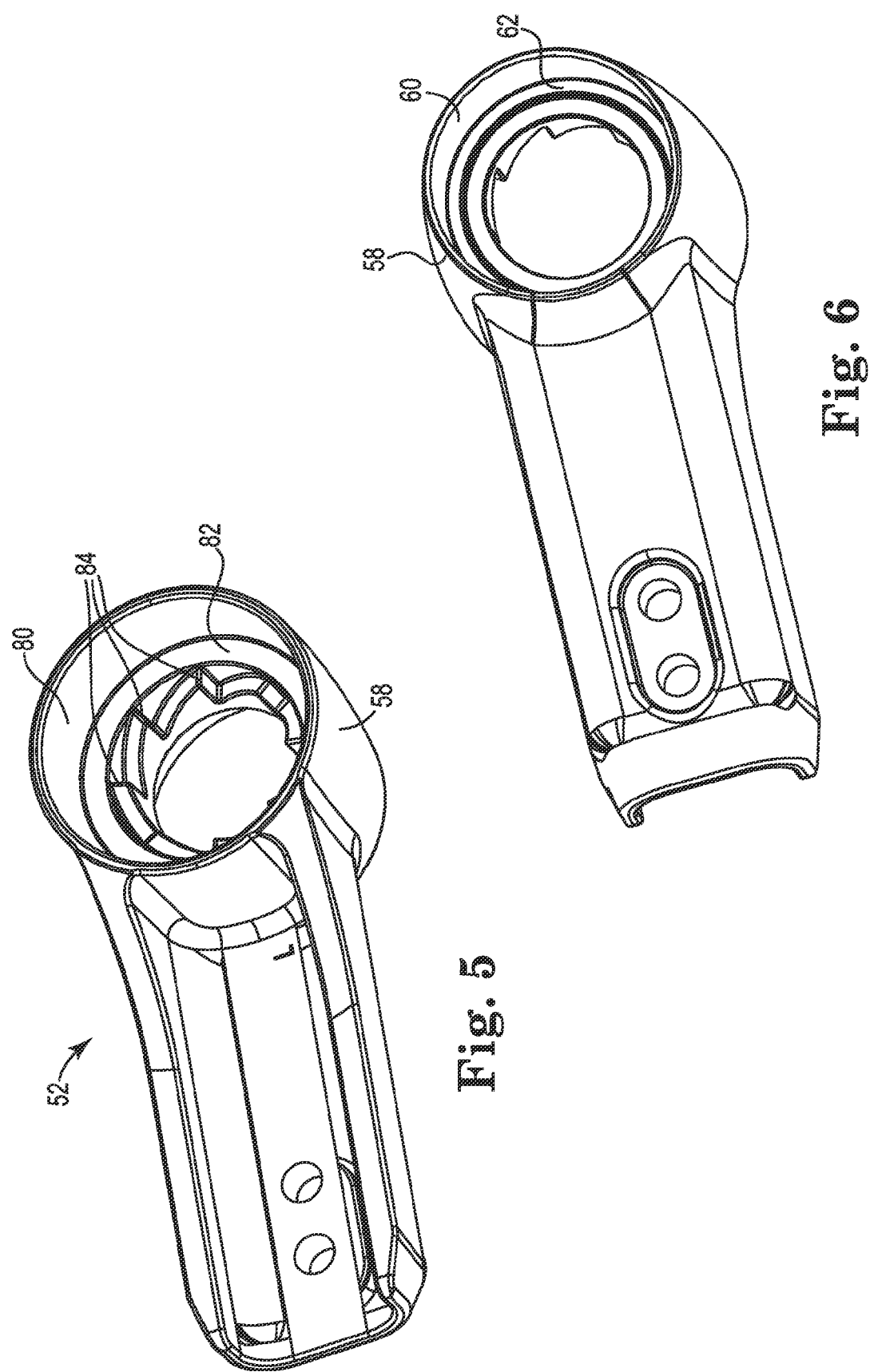
FIG. 5 is a rear perspective view of a portion of one embodiment of a support arm that is supported on the hub of FIG. 3.
FIG. 6 is a front perspective view of the support arm of FIG. 5.

Referring now to FIG. 2, in one embodiment support arm 14 is comprised of a first arm portion 52 and a second arm portion 54. The first arm portion 52 has an elongate body 56 and a cylindrical head 58. The cylindrical head 58 is configured to mate to the hub 28 in a manner that will be described in more detail below. As shown in FIGS. 2 and 6, the cylindrical head 58 is also configured with an internal cavity 60 that extends within the head 58 to a radial floor 62. The cavity 60 serves to house a portion of a cylindrical body 64 with a central bore, a spring 66, and a pair of bushings 68, all of which are secured within cavity 60 by a washer and a connector 69 (e.g., a bolt) that connects to the internally threaded bore 24 of mount 12. In one embodiment, bushing 68a is made from brass, and bushing 68b is made from steel. The elongate body 52 of the first arm portion is configured on one side with a channel 70 that is shaped to mate with an elongate body 72 of the second arm portion. Body 52 is configured with a pair of holes 74 that can align with a pair of holes from a plurality of holes 76 formed in body 72. As such, an overall length of support arm 14 can be varied according to a desired location of body 72 within channel 70. The first and second arm portions 52, 54 are thereafter secured together by a pair of connectors 78, which comprise bolts and nuts (shown in FIG. 1). In one embodiment, an end of the second arm portion 54 is provided with a splined connecting surface having a central internally threaded post for connecting the clevis-type connector 16 at any desired radial position.

FIG. 5 is a rear perspective view of the first arm portion 52. As shown in FIG. 5, the head 58 of the first arm portion is configured with a cavity 80 and a radial shoulder 82 that extends around the inner surface of cavity 80. Immediately adjacent to the radial shoulder is a plurality of radially-spaced, ramped teeth 84 that are formed to mate with the ramped teeth 44 when the face 42 of the hub 28 is in contact with the radial shoulder 82. As such, each ramped portion of teeth 84 is slightly concave. The number, spacing and angle of each ramped portion may be varied as previously described relative to the ramped surfaces associated with hub 28.

Figure 7:
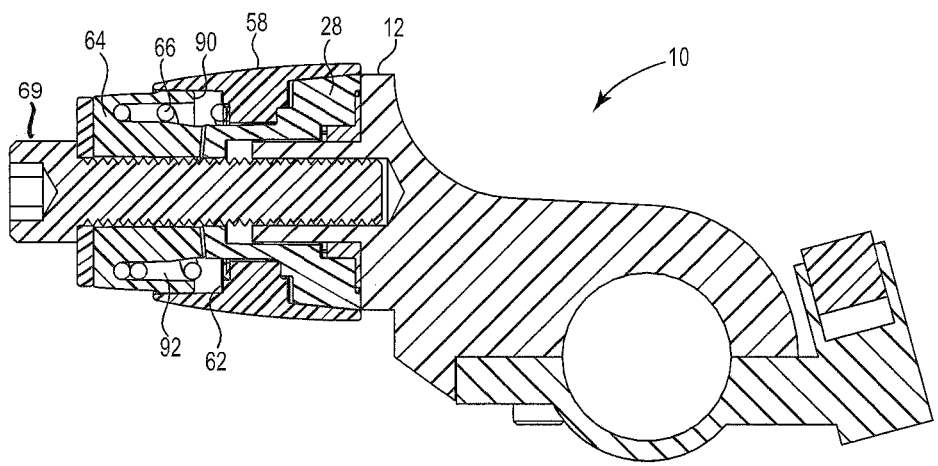
FIG. 7. is a cross-sectional view of the adjustable motorcycle footrest mount of FIG. 1 taken along line 7-7.

FIG. 7 is a cross-sectional view of the adjustable motorcycle footrest mount 10 of FIG. 1. As shown in FIG. 7, when the footrest mount 10 is assembled, the hub 28 positioned next to the mount 12, and the head 58 of the first arm portion 52 is positioned over the hub 28 with the respective ramped teeth of the head 58 and hub 28 fully engaging one another. The cylindrical body 64 is positioned within cavity 60 of head 58 with the inner end 90 of cylindrical body 64 spaced from the radial floor 62 of head 58. The cylindrical body 64 is maintained in this spaced position by a connecting bolt that connects to mount 12. As further shown in FIG. 7, the cylindrical body includes a cylindrical recess 92 which captures part of the spring 66. With the cylindrical body positioned as shown in FIG. 7, the spring 66 is under compression with one end of spring 66 contacting the radial floor 62 of head 58, and the other end of spring 66 contacting the base of the recess 92. The spring force of spring 66 thus maintains the teeth 84 of head 58 in full engagement with the teeth 44 of hub 28. Referring to FIGS. 2 and 7, when a downward force is applied to arm 14, the ramped portion of teeth 84 of head 58 slide up the respective ramped portion of teeth 44 thereby allowing arm 14 to rotate downward until the radial floor 62 engages the inner end 90 of the cylindrical body 64. Through this movement of radial floor 62 towards the inner end 90 of cylindrical body 64, spring 66 is further compressed. The downward rotation of support arm 14 increases the distance of the footrest thereby giving a motorcycle operator a more comfortable location for resting the operator's feet, such as on long motorcycle trips. When the operator removes his or her feet from the footrest, the spring force is able to return the support arm 14 to its original home position (FIGS. 2 and 7). The adjustable motorcycle footrest mount 10 as disclosed affords a footrest mount with support arm length adjustment and a footrest height adjustment that lowers the position of the footrest by application of force from a motorcycle operator's feet, and automatically returns to a higher, home position when the operator's force is removed.

It is to be understood that the features of the various exemplary embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A motorcycle operator footrest assembly comprising:
a mount connectable to a motorcycle near a front end of the motorcycle, the mount comprising a mounting surface defining a helical ramp;
a support arm pivotally connected to the mount and having a head and an elongate body extending from the head, the head having a first side configured to engage the helical ramp such that the head moves away from the mount upon a pivotal movement of the support arm, and a second side, the second side communicating with the first side, the head configured to connect relative to the mounting surface, the elongate body configured to connect a footrest at an end opposite the head;
a connector connecting the head of the support arm to the mount; and
a body having a bearing surface positioned on the second side of the head, the body being carried on the connector,
wherein the support arm is pivotable from a first, home position downward to a second position upon application of force on the footrest by the operator, and wherein the support arm is biased to return to the first, home position when the operator force is removed, and
wherein the bearing surface restricts axial movement of the head relative to the mount when the support arm pivots to the second position.

2. The motorcycle operator footrest assembly of claim 1, wherein the helical ramp comprises a plurality of teeth.

3. The motorcycle operator footrest assembly of claim 1, wherein the helical ramp comprises a contiguous helical ramp.

4. The motorcycle operator footrest assembly of claim 1, wherein the head is biased towards the helical ramp.

5. A motorcycle operator footrest assembly comprising:
a mount connectable to a motorcycle near a front end of the motorcycle, the mount comprising a mounting surface configured to define a helical ramp, the mount configured with a mounting hole;
a support arm pivotally connected to the mounting surface, the support arm having a head and an elongate body extending from the head, the head having a first side configured to engage the helical ramp such that the head moves away from the mount upon a pivotal movement of the support arm, the elongate body configured to connect a footrest at an end opposite the head;
a connector configured to connect the support arm head relative to the mounting hole; and
a body having a bearing surface positioned on a second side of the head opposite the first side of the head, the body being carried on the connector,
wherein the support arm is pivotable from a first, home position downward to a second position upon application of force on the footrest by the operator, and wherein the support arm is biased to return to the first, home position when the operator force is removed, and
wherein the bearing surface restricts axial movement of the head relative to the mount when the support arm pivots to the second position.

\* \* \* \* \*